(12) United States Patent
Delachanal

(10) Patent No.: US 10,268,896 B1
(45) Date of Patent: Apr. 23, 2019

(54) SYSTEMS AND METHODS FOR DETERMINING VIDEO HIGHLIGHT BASED ON CONVEYANCE POSITIONS OF VIDEO CONTENT CAPTURE

(71) Applicant: GOPRO, INC., San Mateo, CA (US)

(72) Inventor: Christophe Delachanal, Lumbin (FR)

(73) Assignee: GoPro, Inc., San Mateo, CA (US)

( * ) Notice: Subject to any disclaimer, the term of this patent is extended or adjusted under 35 U.S.C. 154(b) by 220 days.

(21) Appl. No.: 15/286,415

(22) Filed: Oct. 5, 2016

(51) Int. Cl.
*G06K 9/00* (2006.01)
*H04N 5/247* (2006.01)
*G06T 7/00* (2017.01)
*G11B 27/10* (2006.01)
*H04N 5/225* (2006.01)
*G06F 16/74* (2019.01)

(52) U.S. Cl.
CPC ....... *G06K 9/00751* (2013.01); *G06F 16/743* (2019.01); *G06K 9/00765* (2013.01); *G06T 7/004* (2013.01); *G11B 27/10* (2013.01); *H04N 5/2252* (2013.01); *H04N 5/247* (2013.01); *G06K 2009/00738* (2013.01); *G06T 2207/30244* (2013.01)

(58) Field of Classification Search
None
See application file for complete search history.

(56) References Cited

U.S. PATENT DOCUMENTS 5,260,779 A 11/1993 Wasserman
5,555,895 A 9/1996 Ulmer
(Continued)

FOREIGN PATENT DOCUMENTS

EP 0605045 A1 7/1994
EP 0650299 A1 4/1995
(Continued)

OTHER PUBLICATIONS

Mai Zheng et al: "Stitching Video from Webcams", Dec. 1, 2008 (Dec. 1, 2008), Advances in Visual Computing: 4th International Symposium, ISVC 2008, Las Vegas, NV, USA, Dec. 1-3, 2008. Proceedings, Part II, Springer Berlin Heidelberg, Berlin, Heidelberg, pp. 420-429, XP019112243, ISBN: 978-3-540-89645-6 le document en entier.

(Continued)

*Primary Examiner* — Heather R Jones
(74) *Attorney, Agent, or Firm* — Esplin & Associates, PC

(57) ABSTRACT

First video information defining first video content may be accessed. The first video content may have been captured by a first image sensor from a first conveyance position. Second video information defining second video content may be accessed. The second video content may have been captured by a second image sensor from a second conveyance position. A first highlight criterion may be selected for the first video content based on the first conveyance position. A second highlight criterion may be selected for the second video content based on the second conveyance position. A first set of highlight moments within the first video content may be identified based on the first criterion. A second set of highlight moments within the second video content may be identified based on the second criterion. The identification of the first set of highlight moments and the second set of highlight moments may be stored.

20 Claims, 8 Drawing Sheets

(56) References Cited

U.S. PATENT DOCUMENTS

| | | |
|---|---|---|
| 6,434,265 B1 | 8/2002 | Xiong |
| 6,486,908 B1 | 11/2002 | Chen |
| 6,710,740 B2 | 3/2004 | Needham |
| 6,711,293 B1 | 3/2004 | Lowe |
| 6,788,333 B1 | 9/2004 | Uyttendaele |
| 7,057,663 B1 | 6/2006 | Lee |
| 7,403,224 B2 | 7/2008 | Fuller |
| 7,983,502 B2 | 7/2011 | Cohen |
| 8,411,166 B2 | 4/2013 | Miyata |
| 8,606,073 B2 | 12/2013 | Woodman |
| 8,670,030 B2 | 3/2014 | Tanaka |
| 8,842,197 B2 | 9/2014 | Singh |
| 8,890,954 B2 | 11/2014 | O'Donnell |
| 8,896,694 B2 | 11/2014 | O'Donnell |
| 9,019,396 B2 | 4/2015 | Kiyoshige |
| 9,158,304 B2 | 10/2015 | Fleck |
| 9,342,534 B2 | 5/2016 | Singh |
| 9,409,646 B2 | 8/2016 | Fleck |
| 9,473,758 B1 | 10/2016 | Long |
| 9,602,795 B1 | 3/2017 | Matias |
| 2002/0112005 A1 | 8/2002 | Namias |
| 2002/0122113 A1 | 9/2002 | Foote |
| 2002/0191087 A1 | 12/2002 | Hashimoto |
| 2003/0085992 A1 | 5/2003 | Arpa |
| 2003/0098954 A1 | 5/2003 | Amir |
| 2003/0160862 A1 | 8/2003 | Charlier |
| 2004/0010804 A1 | 1/2004 | Hendricks |
| 2004/0021780 A1 | 2/2004 | Kogan |
| 2004/0047606 A1 | 3/2004 | Mikawa |
| 2004/0075738 A1 | 4/2004 | Burke |
| 2004/0135900 A1 | 7/2004 | Pyle |
| 2004/0169724 A1 | 9/2004 | Ekpar |
| 2005/0033760 A1 | 2/2005 | Fuller |
| 2005/0062869 A1 | 3/2005 | Zimmermann |
| 2005/0104976 A1 | 5/2005 | Currans |
| 2005/0134707 A1 | 6/2005 | Perotti |
| 2005/0289111 A1 | 12/2005 | Tribble |
| 2006/0050997 A1 | 3/2006 | Imamura |
| 2007/0030358 A1 | 2/2007 | Aoyama |
| 2007/0053659 A1 | 3/2007 | Kiyama |
| 2007/0120986 A1 | 5/2007 | Nunomaki |
| 2007/0140662 A1 | 6/2007 | Nunomaki |
| 2007/0300249 A1 | 12/2007 | Smith |
| 2008/0094499 A1 | 4/2008 | Ueno |
| 2008/0118100 A1 | 5/2008 | Hayashi |
| 2009/0210707 A1 | 8/2009 | De Lutiis |
| 2009/0251558 A1 | 10/2009 | Park |
| 2009/0262206 A1 | 10/2009 | Park |
| 2009/0271447 A1 | 10/2009 | Shin |
| 2010/0045773 A1 | 2/2010 | Ritchey |
| 2010/0097443 A1 | 4/2010 | Lablans |
| 2010/0238304 A1 | 9/2010 | Miyata |
| 2010/0250022 A1 | 9/2010 | Hines |
| 2010/0289924 A1 | 11/2010 | Koshikawa |
| 2010/0299630 A1 | 11/2010 | McCutchen |
| 2011/0013778 A1 | 1/2011 | Takumai |
| 2011/0115883 A1 | 5/2011 | Kellerman |
| 2011/0141300 A1 | 6/2011 | Stec |
| 2011/0261227 A1 | 10/2011 | Higaki |
| 2012/0206565 A1 | 8/2012 | Villmer |
| 2012/0242798 A1 | 9/2012 | Mcardle |
| 2012/0263430 A1* | 10/2012 | Spitzer-Williams ......................... H04N 5/772 386/224 |
| 2013/0021450 A1 | 1/2013 | Yoshizawa |
| 2013/0058532 A1 | 3/2013 | White |
| 2013/0058619 A1 | 3/2013 | Miyakawa |
| 2013/0127903 A1 | 5/2013 | Paris |
| 2013/0176403 A1 | 7/2013 | Varga |
| 2013/0177168 A1 | 7/2013 | Inha |
| 2013/0182177 A1 | 7/2013 | Furlan |
| 2013/0210563 A1 | 8/2013 | Hollinger |
| 2013/0235226 A1 | 9/2013 | Karn |
| 2014/0037268 A1 | 2/2014 | Shoji |
| 2014/0039884 A1 | 2/2014 | Chen |
| 2014/0240122 A1 | 8/2014 | Roberts |
| 2015/0055937 A1 | 2/2015 | Van Hoff |
| 2015/0058102 A1 | 2/2015 | Christensen |
| 2015/0142211 A1 | 5/2015 | Shehata |
| 2015/0142742 A1 | 5/2015 | Hong |
| 2015/0166476 A1 | 6/2015 | Chen |
| 2015/0186073 A1 | 7/2015 | Pacurariu |
| 2015/0189221 A1 | 7/2015 | Nakase |
| 2015/0287435 A1 | 10/2015 | Land |
| 2015/0288754 A1 | 10/2015 | Mosko |
| 2015/0304532 A1 | 10/2015 | Bart |
| 2015/0336015 A1 | 11/2015 | Blum |
| 2015/0350614 A1 | 12/2015 | Meier |
| 2015/0363648 A1 | 12/2015 | Li |
| 2015/0367958 A1 | 12/2015 | Lapstun |
| 2015/0370250 A1 | 12/2015 | Bachrach |
| 2016/0005435 A1 | 1/2016 | Campbell |
| 2016/0018822 A1 | 1/2016 | Nevdahs |
| 2016/0031559 A1 | 2/2016 | Zang |
| 2016/0042475 A1* | 2/2016 | Tapia ..................... G06Q 50/01 386/224 |
| 2016/0054737 A1 | 2/2016 | Soll |
| 2016/0076892 A1 | 3/2016 | Zhou |
| 2016/0098469 A1 | 4/2016 | Allinson |
| 2016/0101856 A1 | 4/2016 | Kohstall |
| 2016/0112713 A1 | 4/2016 | Russell |
| 2016/0129999 A1 | 5/2016 | Mays |
| 2016/0139596 A1 | 5/2016 | Na |
| 2016/0139602 A1 | 5/2016 | Kohstall |
| 2016/0165563 A1 | 6/2016 | Jang |
| 2016/0179096 A1 | 6/2016 | Bradlow |
| 2016/0189101 A1 | 6/2016 | Kantor |
| 2016/0225410 A1* | 8/2016 | Lee ................. H04N 21/21805 |
| 2016/0234438 A1 | 8/2016 | Satoh |
| 2016/0239340 A1 | 8/2016 | Chauvet |
| 2016/0269621 A1 | 9/2016 | Cho |
| 2016/0295108 A1 | 10/2016 | Cao |
| 2016/0304198 A1 | 10/2016 | Jourdan |
| 2016/0306351 A1 | 10/2016 | Fisher |
| 2016/0313734 A1 | 10/2016 | Enke |
| 2016/0327950 A1 | 11/2016 | Bachrach |
| 2016/0336020 A1 | 11/2016 | Bradlow |
| 2016/0366290 A1 | 12/2016 | Hoshino |

FOREIGN PATENT DOCUMENTS

| | | |
|---|---|---|
| EP | 0661672 A1 | 7/1995 |
| WO | 2009047572 A1 | 4/2009 |
| WO | 2014090277 A1 | 6/2014 |

OTHER PUBLICATIONS

Ryan Jackson: 'Shooting 360-degree video with four GoPro HD Hero cameras / Ryan Jackson Photography' Feb. 8, 2011 (Feb. 8, 2011), XP055099926, Extrait de l'Internet: URL:http://punkoryan.com/2011/02/08/shooting-360-degree-video-with-four-gopro-hd-hero-cameras [extrait le Feb. 3, 2014] 37 pages.

PCT International Search Report for PCT/EP2014/061897 dated Sep. 15, 2014, 3 pages.

PCT International Search Report for PCT/EP2014/058008 dated May 26, 2014, 3 pages.

Foote J et al: 'FlyCam: Practical Panoramic Video and Automatic Camera Control', Multimedia and Expo, 2000. ICME 2000. 2000 IEEE International Conference on New York, NY, USA Jul. 30-Aug. 2. 2000, Piscataway, NJ, USA,IEEE, US, vol. 3, Jul. 30, 2000 (Jul. 30, 2000), pp. 1419-1422, XP010512772, DOI: 10.1109/ICME.2000.871033 ISBN: 978-0-7803-6536-0.

Hossein Afshari et al: "The Panoptic Camera: A Plenoptic Sensor with Real-Time Omnidirectional Capability", Journal of Signal Processing Systems, vol. 70, No. 3, Mar. 14, 2012 (Mar. 14, 2012), pp. 305-328, XP055092066, ISSN: 1939-8018, DOI: 10.1007/s11265-012-0668-4.

Benjamin Meyer et al: "Real-time Free-Viewpoint Navigation from Compressed Multi-Video Recordings", Proc. 3D Data Processing, Visualization and Transmission (3DPVT), May 31, 2010 (May 31,

(56) References Cited

OTHER PUBLICATIONS

2010), pp. 1-6, XP055091261, Extrait de l'Internet: URL:http://www.cg.cs.tu-bs.de/media/publications/meyer2010realtime.pdf [extrait le Dec. 3, 2013].

Lipski, C.: "Virtual video camera", SIGGRAPH '09: Posters on, SIGGRAPH '09, vol. 0, Jan. 1, 2009 (Jan. 1, 2009), pp. 1-1, XP055091257, New York, New York, USA DOI: 10.1145/1599301.1599394.

Felix Klose et al: "Stereoscopic 3D View Synthesis From Unsynchronized Multi-View Video", Proc. European Signal Processing Conference (EUSIPCO), Barcelona, Spain, Sep. 2, 2011 (Sep. 2, 2011), pp. 1904-1909, XP055091259, Extrait de l'Internet: URL:http://www.cg.cs.tu-bs.de/media/publications/eusipco2011_3d_synth.pdf [extrait le Dec. 3, 2013].

PCT International Search Report for PCT/EP2014/057352 dated Jun. 27, 2014, 3 pages.

Farin et al., "Shortest Circular Paths on Planar Graphs," In 27th Symposium on Information Theory in the Benelux 2006, 8 pgs.

Zhi et al., "Toward Dynamic Image Mosaic Generation With Robustness to Parallax," IEEE Transactions on Image Processing, vol. 21, No. 1, Jan. 2012, pp. 366-378.

Perazzi et al., "Panoramic Video from Unstructured Camera Arrays," Eurographics, vol. 34 (2015), No. 2, 12pgs.

U.S. Appl. No. 14/920,427, filed Oct. 22, 2015, entitled "Apparatus and Methods for Embedding Metadata Into Video Stream" 62 pages.

U.S. Appl. No. 14/949,786, filed Nov. 23, 2015, entitled "Apparatus and Methods for Image Alignment" 67 pages.

U.S. Appl. No. 14/927,343, filed Oct. 29, 2015, entitled "Apparatus and Methods for Rolling Shutter Compensation for Multi-Camera Systems" 45 pages.

U.S. Appl. No. 15/001,038, filed Jan. 19, 2016, entitled "Metadata Capture Apparatus and Methods" 54 pages.

"Spatial Audio Lecture Series," Regents of the University of California at Berkeley, Center for New Music and Audio Technologies, 2015, 1 Page, [online] [retrieved on Aug. 20, 2015] Retrieved from the internet <URL:http:I/cnmat.berkelev.edu/spatialaudiolectures>.

O'Donovan, A., et al., "Real Time Capture of Audio Images and their Use with Video," 2007 IEEE Workshop on Applications of Signal Processing to Audio and Acoustics, Oct. 21-24, 2007, pp. 10-13.

O'Donovan, A., et al., "Audio-Visual Panoramas and Spherical Audio Analysis using the Audio Camera," Proceedings of the 16th International Conference on Auditory Display, Jun. 9-15, 2010, pp. ICAD-167-168, can be retrieved at <URL: https://smartech.gatech.edu/bitstream/handle/1853/49858/0%27DonovanDuraiswami2010.pdf?sequence=1 >.

PCT International Search Report and Written Opinion for PCT/US15/38913, dated Sep. 29, 2015, 15 Pages.

\* cited by examiner

| Conveyance Position | Criteria |
|---|---|
| Conveyance Position A | Criterion A-1, Criterion A-2 |
| Conveyance Position B | Criterion B-1, Criterion B-2, Criterion B-3 |
| Conveyance Position C | Criterion C-1, Criterion C-2 |
| Conveyance Position D | Criterion D-1, Criterion D-2 |
| Conveyance Position E | Criterion E-1 |
| . . . | . . . |
| Other Conveyance Position | Other Criteria |

FIG. 4

SYSTEMS AND METHODS FOR DETERMINING VIDEO HIGHLIGHT BASED ON CONVEYANCE POSITIONS OF VIDEO CONTENT CAPTURE

FIELD

This disclosure relates to systems and methods that determine video highlights based on conveyance positions of video content capture.

BACKGROUND

Different views of a scene may be captured within different videos by different image sensors from different conveyance positions. Based on the conveyance positions of capture, the videos may include highlight moments at different moments within the videos. Identifying different highlight moments within different video may be time consuming.

SUMMARY

This disclosure relates to determining video highlights based on conveyance positions of video content capture. First video information defining first video content may be accessed. The first video content may have been captured by a first image sensor from a first conveyance position. Second video information defining second video content may be accessed. The second video content may have been captured by a second image sensor from a second conveyance position. A first highlight criterion may be selected for the first video content based on the first conveyance position. A second highlight criterion may be selected for the second video content based on the second conveyance position. A first set of highlight moments within the first video content may be identified based on the first criterion. A second set of highlight moments within the second video content may be identified based on the second criterion. The identification of the first set of highlight moments and the second set of highlight moments may be stored.

A system that determines video highlights based on conveyance positions of video content capture may include one or more processors, and/or other components. The processor(s) may be configured by machine-readable instructions. Executing the machine-readable instructions may cause the processor(s) to facilitate determining video highlights based on conveyance positions of video content capture. The machine-readable instructions may include one or more computer program components. The computer program components may include one or more of a video information component, a highlight criterion component, a highlight identification component, a storage component, and/or other computer program components. In some implementations, the computer program components may include a video summary component.

The video information component may be configured to access video information. The video information component may access first video information defining first video content, second video information defining second video content, and/or other video information defining other video content. The first video content may have been captured by one or more image sensors from a first conveyance position. The second video content may have been captured by one or more image sensors from a second conveyance position. The first video content and the second video content may be time synced.

In some implementations, a conveyance position of an image sensor may be determined based on metadata associated with the video content, visual analysis of the video content, manual identification of the conveyance position, an image sensor mount for the image sensor, and/or other information. The first conveyance position of the first image sensor may be determined based on first metadata associated with the first video content, visual analysis of the first video content, manual identification of the first conveyance position, a first image sensor mount for the first image sensor, and/or other information. The second conveyance position of the second image sensor may be determined based on second metadata associated with the second video content, visual analysis of the second video content, manual identification of the second conveyance position, a second image sensor mount for the second image sensor, and/or other information.

In some implementations, a conveyance position of an image sensor may indicate a type of the image sensor and/or other information. The first conveyance position of the first image sensor may indicate a type of the first image sensor. The second conveyance position of the second image sensor may indicate a type of the second image sensor. The type of the image sensor may include a handheld image sensor, a body-mounted image sensor, a head-mounted image sensor, an object-mounted image sensor, or other types of image sensors.

The highlight criterion component may be configured to select one or more highlight criteria based on one or more conveyance positions of one or more image sensors. The highlight criterion component may select a first highlight criterion and/or other highlight criteria for the first video content based on the first conveyance position and/or other information. The highlight criterion component may select a second highlight criterion and/or other highlight criteria for the second video content based on the second conveyance position and/or other information. In some implementations, one or more highlight criteria may include a visual criterion, an audio criterion, a metadata criterion, and/or other criteria.

The highlight identification component may be configured to identify one or more highlight moments within one or more video content based on one or more highlight criteria. The highlight identification component may identify a first set of highlight moments and/or other highlight moments within the first video content based on the first criterion and/or other information. The highlight identification component may identify a second set of highlight moments and/or other highlight moments within the second video content based on the second criterion and/or other information.

The storage component may be configured to store the identification of one or more highlight moments. The storage component may store the identification of the first set of highlight moments and/or other highlight moments within the first video information and/or other information. The storage component may store the identification of the first set of highlight moments and/or other highlight moments within metadata associated with the first video content and/or other locations. The storage component may store the identification of the second set of highlight moments and/or other highlight moments within the second video information and/or other information. The storage component may store the identification of the second set of highlight moments and/or other highlight moments within metadata associated with the second video content and/or other locations.

The video summary component may be configured to generate one or more video summaries based on one or more highlight moments within one or more video content. The video summary component may generate a video summary based on the first set of highlight moments, the second set of highlight moments, and/or other information.

In some implementations, generating the video summary based on the first set of highlight moments and the second set of highlight moments may include identifying a first set of video segments from the first video content and a second set of video segments from the second video content. The first set of video segments may include one or more of the first set of highlight moments. The second set of video segments may include one or more of the second set of highlight moments.

In some implementations, one or more video segments from the first set of video segments and one or more video segments from the second set of video segments may be arranged in the video summary based on times of capture of the one or more video segments from the first set of video segments and the one or more video segments from the second set of video segments. In some implementations, one or more video segments from the first set of video segments and one or more video segments from the second set of video segments included in the video summary may include views of one or more same scenes.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 4 illustrates exemplary highlight criteria corresponding to different conveyance positions of image sensors.

DETAILED DESCRIPTION

Figure 1:
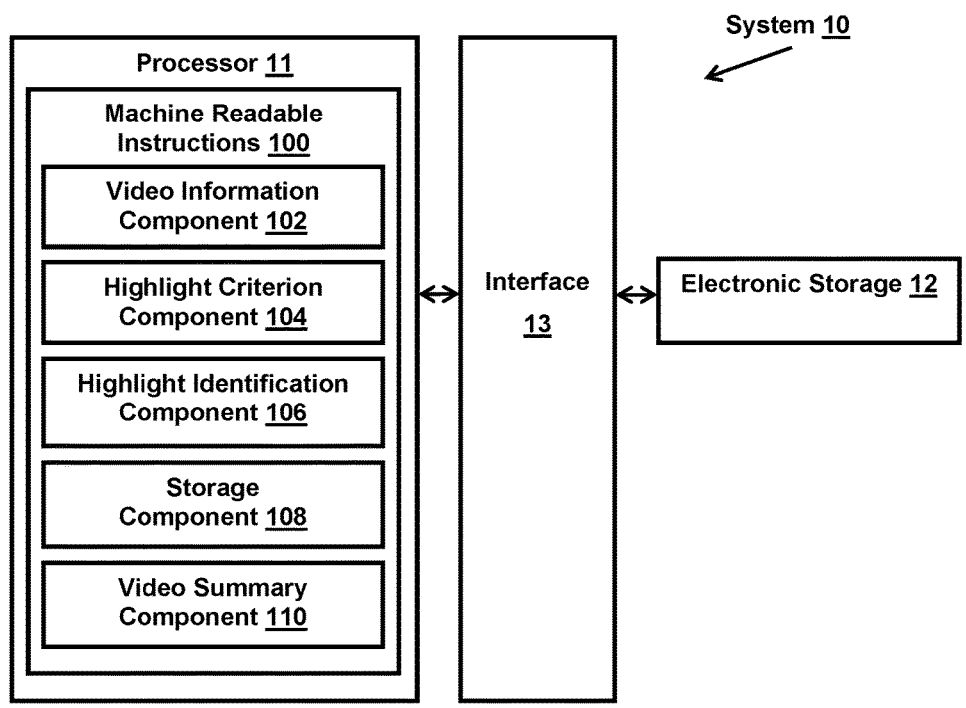
FIG. 1 illustrates a system that determines video highlights based on conveyance positions of video content capture

FIG. 1 illustrates system 10 for determining video highlights based on conveyance positions of video content capture. System 10 may include one or more of processor 11, electronic storage 12, interface 13 (e.g., bus, wireless interface), and/or other components. First video information defining first video content may be accessed by processor 11. The first video content may have been captured by a first image sensor from a first conveyance position. Second video information defining second video content may be accessed by processor 11. The second video content may have been captured by a second image sensor from a second conveyance position. A first highlight criterion may be selected for the first video content based on the first conveyance position. A second highlight criterion may be selected for the second video content based on the second conveyance position. A first set of highlight moments within the first video content may be identified based on the first criterion. A second set of highlight moments within the second video content may be identified based on the second criterion. The identification of the first set of highlight moments and the second set of highlight moments may be stored.

Video content may refer to media content that may be consumed as one or more videos. Video content may include one or more videos stored in one or more formats/container, and/or other video content. Video content may have been captured by one or more image sensors. Video content may have been captured from a stationary position and/or a moving position. Video content may have a progress length. A progress length may be defined in terms of time durations and/or frame numbers. For example, video content may have a time duration of 60 seconds. Video content may include 1800 video frames. Video content having 1800 video frames may have a play time duration of 60 seconds when viewed at 30 frames/second. Other time durations and frame numbers are contemplated.

In some implementations, video content may include panoramic video content. Panoramic video content may provide a wide view of one or more scenes captured by one or more image sensors. For example, video content may include spherical video content obtained by spherical capture. Spherical capture may include the use of one or more image sensors to capture images/videos. The captured images/videos may be stitched together to form spherical video content. Spherical video content may include a full spherical video capture (360 degrees of capture) or a partial spherical video capture (less than 360 degrees of capture).

Electronic storage 12 may be configured to include electronic storage medium that electronically stores information. Electronic storage 12 may store software algorithms, information determined by processor 11, information received remotely, and/or other information that enables system 10 to function properly. For example, electronic storage 12 may store information relating to video information, video content, image sensors, image sensor conveyance positions, highlight criterion, highlight moments, video summary, and/or other information.

Processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more machine readable instructions 100 to facilitate determining video highlights based on conveyance positions of video content capture. Machine readable instructions 100 may include one or more computer program components. Machine readable instructions 100 may include one or more of video information component 102, highlight criterion component 104, highlight identification component 106, storage component 108, and/or other computer program components. In some implementations, machine readable instructions 100 may include video summary component 110.

Video information component 102 may be configured to access video information. Video information may define one or more video content. Video content may have been captured by one or more image sensors from one or more conveyance positions. A conveyance position may refer to a position at which one or more image sensors are carried (e.g., attached to, supported, held, disposed on, mounted on, and/or otherwise carried) on a subject or equipment that moves with the subject through an activity. The conveyance position of an image sensor may be static or dynamic with respect to the subject and/or the equipment. For example, a conveyance position of an image sensor may be fixed relative to the subject and/or the equipment (e.g., image sensor mounted on a body of a subject). A conveyance position of an image sensor may allow for movement of the image sensor with respect to a certain position of the subject and/or the equipment (e.g., image sensor movable on a rail mounted on an equipment). As non-limiting examples, conveyance positions of an image sensor may be on/near the head, hand, arm, shoulder, chest, stomach, leg, foot, and/or other body parts of a subject, on/near a part of an equipment that moves with the subject (e.g., a part of a camera handle, a part of a bike/car/skateboard/surfboard, a part of a backpack), and/or other positions.

Video information component 102 may access one or more video information from one or more storage locations. A storage location may include electronic storage 12, electronic storage of one or more image sensors (not shown in FIG. 1), and/or other locations. Video information component 102 may be configured to access video information defining one or more video content during acquisition of the video information and/or after acquisition of the video information by one or more image sensors. For example, video information component 102 may access video information defining a video while the video is being captured by one or more image sensors. Video information component 102 may access video information defining a video after the video has been captured and stored in memory (e.g., electronic storage 12).

Figure 3:
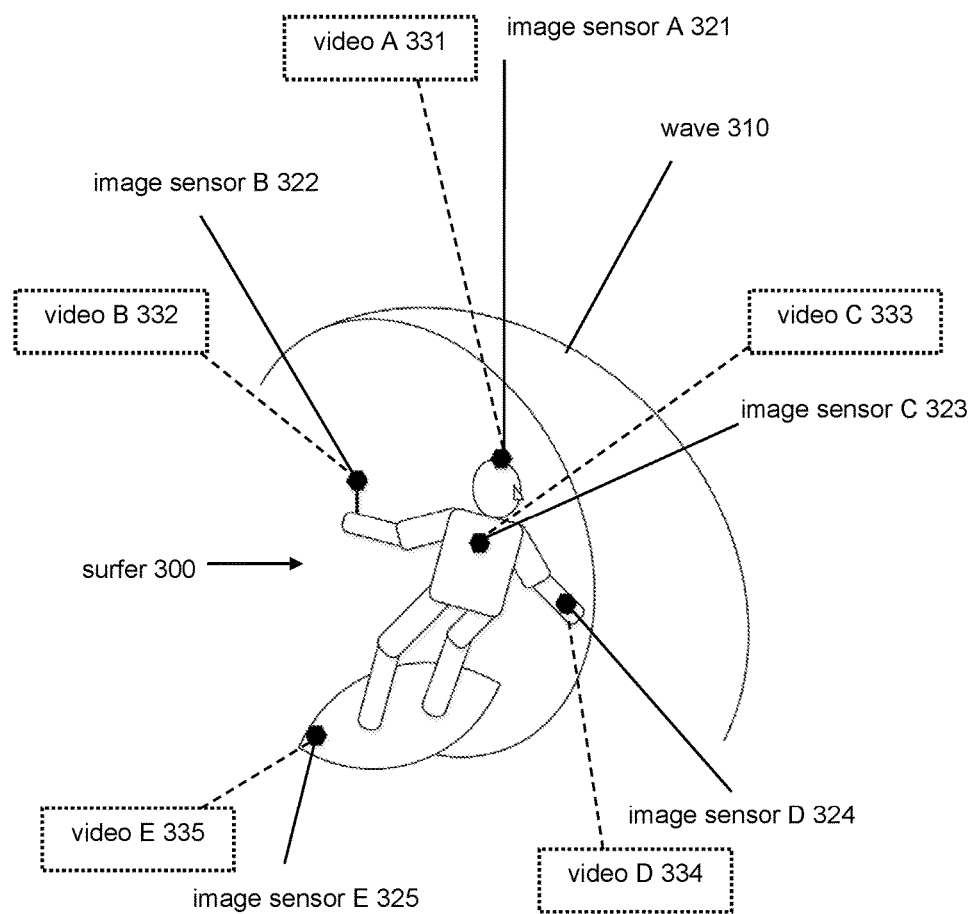
FIG. 3 illustrates exemplary conveyance positions of image sensors.

For example, video information component 102 may access one or more video information defining one or more video contents captured by image sensors 321, 322, 323, 324, 325 shown in FIG. 3. In FIG. 3, surfer 300 may be riding wave 310 while using one or more image sensors 321, 322, 323, 324, 325. Image sensor A 321 may be conveyed on/near the head of surfer 300. For example, image sensor A 321 may be mounted on head/helmet of surfer 300. Image sensor B 322 may be conveyed on/near a hand of surfer 300. For example, image sensor B 322 may be mounted on a camera handle held by surfer 300. Image sensor C 323 may be conveyed on/near the chest of surfer 300. For example, image sensor C 323 may be mounted on the chest of surfer 300. Image sensor D 324 may be conveyed on/near the a hand of surfer 300. For example, image sensor D 324 may be mounted on a wrist strap of surfer 300. Image sensor E 325 may be conveyed on/near a surfboard of surfer 300. For example, image sensor 325 may be mounted on the surfboard of surfer 300. Other conveyance positions and/or mounting of image sensors are contemplated.

Video information component 102 may access video information defining video A 331 captured by image sensor A 321 from its conveyance position on/near the head of surfer 300. Video information component 102 may access video information defining video B 332 captured by image sensor B 322 from its conveyance position on/near the hand of surfer 300. Video information component 102 may access video information defining video C 333 captured by image sensor C 323 from its conveyance position on/near the chest of surfer 300. Video information component 102 may access video information defining video D 334 captured by image sensor D 324 from its conveyance position on/near the hand of surfer 300. Video information component 102 may access video information defining video E 335 captured by image sensor E 335 from its conveyance position on/near the surfboard of surfer 300.

Multiple video contents may be time synced. For example, video A 331, video B 332, video C 333, video D 334, video E 335, and/or other video content may be time synced. Video A 331, video B 332, video C 333, video D 334, video E 335, and/or other video content may be time synced via time syncing of image sensor A 321, image sensor B 322, image sensor C 323, image sensor D 324, image sensor E 325, and/or other image sensors. Video A 331, video B 332, video C 333, video D 334, video E 335, and/or other video content may be time synced during capture and/or after capture. Time syncing of two or more video contents may enable generation of video summaries that contain video frames and/or video segments from two or more video contents. The video frames and/or video segments in the video summaries may be arranged/synchronized in time based on the time syncing of the video contents.

In some implementations, the conveyance position of one or more image sensors may be determined based on metadata associated with the video content, visual analysis of the video content, manual identification of the conveyance position, an image sensor mount for the image sensor, and/or other information. Referring to FIG. 3, the conveyance positions of one or more of image sensors 321, 322, 323, 324, 325 may be determined based on metadata associated with videos 331, 332, 333, 334, 335, visual analysis of videos 331, 332, 333, 334, 335, manual identification of the conveyance position(s), and/or image sensor mount(s) for image sensors 321, 322, 323, 324, 325.

For example, the conveyance position of image sensor A 321 may be determined based on metadata associated with video A 331 and/or other information. Metadata associated with video A 331 may refer to data that provides information about video A 331 and/or image sensor A 321. Metadata associated with video A 331 may identify the conveyance position of image sensor A 321 and/or provide information that may be used to determine the conveyance position of image sensor A 321. For example, metadata associated with video A 331 may identify the conveyance position of image sensor A 321 as being conveyed on/near the head of surfer 300 and/or may provide for other information (e.g., position/orientation sensor data for image sensor A 321) that may be used to determine the conveyance position of image sensor A 321.

The conveyance position of image sensor B 322 may be determined based on manual identification and/or other information. For example, a user (e.g., surfer 300) may manually identify the conveyance position of image sensor B 322 as being on/near the hand of surfer 300 and/or being mounted on a camera handle held by surfer 300. The manual identification of the conveyance position of image sensor B 322 may be stored in image sensor B 322, in video information defining video B 322 (e.g., video file), in metadata associated with video B 322, and/or in other locations.

The conveyance positions of image sensor C 323 and image sensor D 324 may be determined based image sensors mounts for image sensor C 323 and image sensor D 324, respectively, and/or other information. An image sensor mount may indicate/communicate to an image sensor its identity and/or its conveyance position. For example, the image sensor mount for image sensor C 323 may indicate/communicate to image sensor C 323 that the image sensor mount is a body frame mount. The conveyance position of image sensor C 323 on/near the chest of surfer 300 may be determined based on the identity of the image sensor mount (e.g., body frame mount) for image sensor C 323. The image sensor mount for image sensor D 324 may indicate/communicate to image sensor D 324 that image sensor D 324 is conveyed on/near the hand of surfer 300.

The conveyance position of image sensor E 325 may be determined based on visual analysis of video E 335 and/or other information. Visual analysis of video E 335 may include object/outline detection and may determine the likely conveyance position of image sensor E 325 based on the visuals captured by image sensor E 325. For example, video E 335 may include a view of surfer 300 and/or the surfboard and the visual analysis of video E 335 may indicate that image sensor E 325 is conveyed in front and below surfer 300, and/or at the front of the surfboard. Other methods of determining conveyance positions of image sensors are contemplated.

In some implementations, a conveyance position of an image sensor may indicate a type of the image sensor and/or other information. The type of image sensors may include a handheld image sensor, a body-mounted image sensor, a head-mounted image sensor, an object-mounted image sensor, or other types of image sensors. Referring to FIG. 3, conveyance positions of one or more of image sensors 321, 322, 323, 324, 325 may indicate the type of image sensors 321, 322, 323, 324, 325. For example, the conveyance position of image sensor A 321 may indicate the type of image sensor A 321 as a head-mounted image sensor. The conveyance position of image sensor B 322 may indicate the type of image sensor B 322 as a handheld image sensor and/or a selfie image sensor. The conveyance positions of image sensor C 323 and image sensor 324 may indicate the type of image sensor C 323 and image sensor D 324 as body-mounted image sensors. The conveyance position of image sensor E 325 may indicate the type of image sensor E 325 as an object-mounted image sensor.

Highlight criterion component 104 may be configured to select one or more highlight criteria based on one or more conveyance positions of one or more image sensors and/or other information. Highlight criteria may provide one or more requirements/analysis for identifying one or more highlight moments captured within video content. Highlight criteria may be specific to a conveyance position of an image sensor and/or a type of an image sensor. In some implementations, highlight criteria may be changed based on the activity of interest (e.g., video content including capture of skiing vs. surfing). In some implementations, highlight component 104 may select one or more highlight criteria based on one or more types of image sensors.

One or more highlight criteria may include a visual criterion, an audio criterion, a metadata criterion, and/or other criteria. A visual criterion may provide one or more visual requirements/analysis for identifying one or more highlight moments within video content. A visual criterion may be met based on presence of one or more particular visuals captured within the video content. For example, a visual criterion may be met based on presence of one or more objects, outlines, persons, actions, events, scenes, and/or other visuals at a time, over a range of times, or at multiple times within the visual content.

An audio criterion may provide one or more audio requirements/analysis for identifying one or more highlight moments within video content. An audio criterion may be met based presence of one or more particular sounds captured within the video content. For example, an audio criterion may be met based on presence of one or more voices, voice commands, voice patterns, particular sounds, music, and/or other sounds at a time, over a range of times, or at multiple times within the visual content.

A metadata criterion may provide one or more metadata requirements/analysis for identifying one or more highlight moments within video content. A metadata criterion may be met based on one or more particular information about the video content and/or the image sensor that captured the video content indicating a particular condition/status of the video content/image sensor. For example, a metadata criterion may be met based on information about the video content/image sensor indicating a particular position, orientations, movement, rotation, speed, acceleration of the video content/image sensor at a time, over a range of times, or at multiple times within the visual content/during the capture of the video content. In some implementations, a metadata criterion may be met based on one or more particular information about a user of the image sensor and/or a person within the video content indicating a particular condition/status of the user/person. For example, a metadata criterion may be met based on particular biometric information about the user/person at a time, over a range of times, or at multiple times during the capture of the video content. Other criteria for identifying highlight moments are contemplated.

Selecting highlight criteria based on conveyance positions of image sensors may allow for highlight detection using criteria that is specific to the conveyance positions of capture and/or the types of image sensors used to capture the video content. Selecting highlight criteria based on conveyance positions of image sensors may allow for highlight detection using different highlight criteria for different video content. In some implementations, one or more highlight criteria for one conveyance position may be the same as one or more highlight criteria for another conveyance position. For example, one or more criteria for one conveyance position may be the same as one or more criteria for another conveyance position.

Highlight criterion component 104 may include and/or retrieve information (for example, a database, etc.) that matches a conveyance position of an image sensor to one or more highlight criteria. Highlight criterion component 104 may select one or more highlight criteria based on the information that matches the conveyance position of an image sensor to one or more highlight criteria. For example, FIG. 4 illustrates exemplary highlight criteria corresponding to different conveyance positions of image sensors. Based on conveyance position A of an image sensor (e.g., image sensor A 321), highlight criterion component 104 may select criterion A-1, criterion A-2, and/or other criteria for the video content (e.g., video A 331) captured by the image sensor. Based on conveyance position B of an image sensor (e.g., image sensor B 322), highlight criterion component 104 may select criterion B-1, criterion B-2, criterion B-3, and/or other criteria for the video content (e.g., video B 332) captured by the image sensor. Based on conveyance position C of an image sensor (e.g., image sensor C 323), highlight criterion component 104 may select criterion C-1, criterion C-2 and/or other criteria for the video content (e.g., video C 333) captured by the image sensor. Based on conveyance position D of an image sensor (e.g., image sensor D 324), highlight criterion component 104 may select criterion D-1, criterion D-2, and/or other criteria for the video content (e.g., video D 334) captured by the image sensor. Based on conveyance position E of an image sensor (e.g., image sensor E 325), highlight criterion component 104 may select criterion E-1 and/or other criteria for the video content (e.g., video E 335) captured by the image sensor. Other selections of criteria based on conveyance positions of image sensors are contemplated.

Highlight identification component 106 may be configured to identify one or more sets of highlight moments within one or more video content based on one or more highlight criteria and/or other information. A set of highlight moments may include one or more highlight moments. For example, highlight identification component 106 may identify one or more sets of highlight moments within video A 331 based on criterion A-1, criterion A-2, and/or other criteria. A set of highlight moments within video A 331 may include one or more highlight moments identified based on visual analysis indicating that surfer 300 is entering/has entered a wave tunnel, visual/metadata analysis indicating that the head of surfer 300 has snapped to look at a particular direction, and/or other highlight criteria. Snapping of the head may be determined based on the speed with which the head has changed orientation, the degree to which the orientation of the head has changed, and/or other information.

Highlight identification component 106 may identify one or more sets of highlight moments within video B 332 based on criterion B-1, criterion B-2, criterion B-3, and/or other criteria. A set of highlight moments within video B 332 may include one or more highlight moments identified based visual analysis indicating that the face of surfer 300 is displaying a particular emotion (e.g., big smile, yelling, surprise), metadata analysis indicating that image sensor B 322 is still or moving/rotating at a constant speed, audio analysis indicating that surfer 300 is yelling or speaking particular words/phrases, and/or other highlight criteria.

Highlight identification component 106 may identify one or more sets of highlight moments within video C 333 based on criterion C-1, criterion C-2, and/or other criteria. A set of highlight moments within video C 333 may include one or more highlight moments identified based on visual/metadata analysis indicating that surfer 300 is undergoing a big change in the path of movement, visual analysis indicating that surfer 300 has entered a wave tunnel, and/or other highlight criteria.

Highlight identification component 106 may identify one or more sets of highlight moments within video D 334 based on criterion D-1, criterion D-2, and/or other criteria. A set of highlight moments within video D 334 may include one or more highlight moments identified based on visual/metadata analysis indicating that the hand of surfer 300 is steady, visual analysis indicating that video D 333 includes particular visuals, and/or other highlight criteria.

Highlight identification component 106 may identify one or more sets of highlight moments within video E 335 based on criterion E-1, and/or other criteria. A set of highlight moments within video E 335 may include one or more highlight moments identified based on visual analysis indicating that surfer 300 has stood up on the surfboard, that surfer 300 has entered a wave tunnel, or that surfer 300 has wiped out. Other identifications of highlight moments within video content based on highlight criteria are contemplated.

One or more criteria (e.g., shown in FIG. 4) may be combined with other criteria for highlight moment identification. Multiple criteria may be used in different combinations to identify highlight moments within video content captured by the image sensor. For example, referring to FIG. 4, criteria based on conveyance position B of an image sensor (e.g., image sensor B 322) may include criterion B-1, criterion B-2, and criterion B-3. Highlight identification component 106 may identify one or more highlight moments within video content (video B 332) captured by the image sensor based on criterion B-1, criterion B-2, or criterion B-3 (meeting any criterion results in highlight moment identification), based on criterion B-1, criterion B-2, and criterion B-3 (meeting all criteria results in highlight moment identification), or some other combinations of criterion B-1, criterion B-2, and/or criterion B-3 (e.g., meeting two of three criteria).

Figure 5:
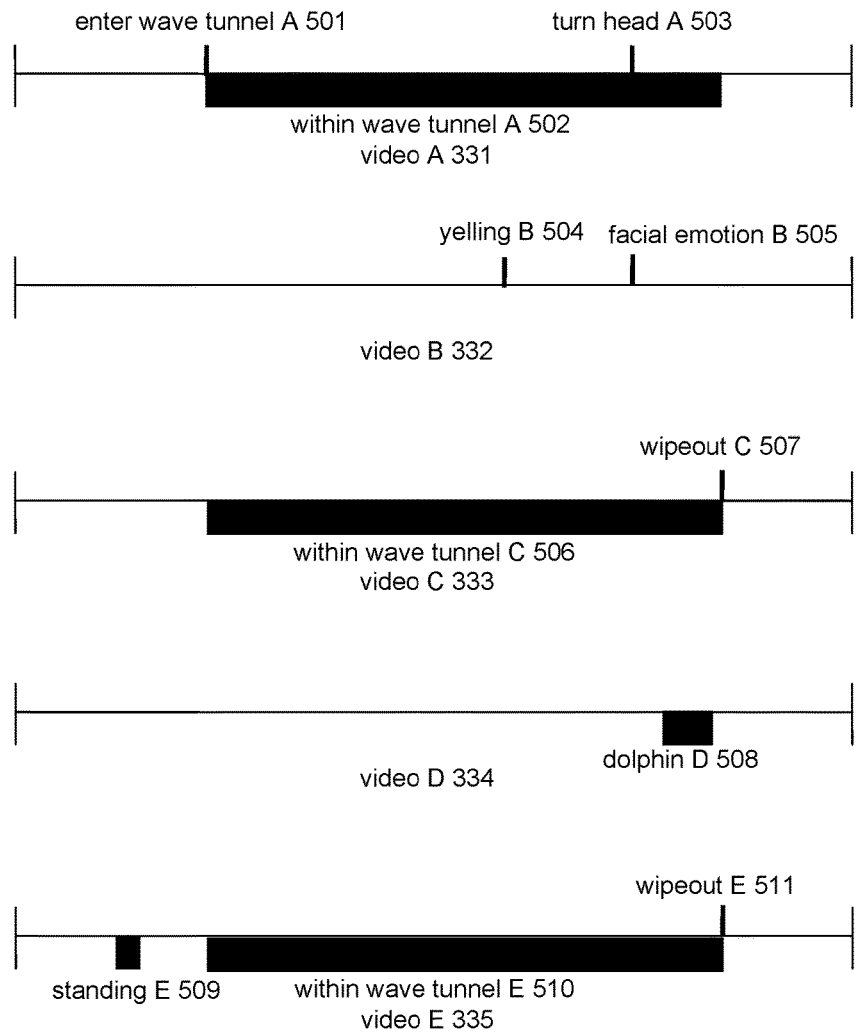
FIG. 5 illustrates exemplary highlight moments within video content.

Highlight moments identified by highlight identification component 106 may correspond to a time/frame, a range of times/frame, or multiple times/frames within the visual content. For example, FIG. 5 illustrates representations of highlight moments identified by highlight identification component 106 within videos 331, 332, 33, 334, 335. Highlight moments within videos 331, 332, 33, 334, 335 may correspond to highlight moments identified during a surfing activity by surfer 300. During the surfing activity, surfer 300 may have stood up on the surfing board, entered a wave tunnel, yelled out in excitement, turned his head in surprise at seeing a dolphin nearby, pointed his hand at the dolphin, lost his balance and wiped out. For ease of reference, highlight moments corresponding to a time/frame is shown above the line representing video content while highlight moments corresponding to a range of times/frames is shown below the line representing video content.

Highlight moments within video A 331 (e.g., captured from a head-mounted image sensor) may include enter wave tunnel A 501 (corresponding to a time/frame when surfer 300 entered the wave tunnel), within wave tunnel A 502 (corresponding to times/frames when surfer 300 was within the wave tunnel), turn head A 503 (corresponding to a time/frame when surfer 300 turned his head to look at the dolphin), and/or other highlight moments.

Highlight moments within video B 332 (e.g., captured from a selfie image sensor mounted on a camera handle) may include yelling B 504 (corresponding to a time/frame when surfer yelled out in excitement), facial emotion B 505 (corresponding to a time/frame when surfer showed surprise at seeing the dolphin), and/or other highlight moments.

Highlight moments within video C 333 (e.g., captured from a body-mounted image sensor) may include within wave tunnel C 506 (corresponding to times/frames when surfer 300 was within the wave tunnel), wipeout C 507 (corresponding to a time/frame when surfer 300 lost his balance and wiped out), and/or other highlight moments.

Highlight moments within video D 334 (e.g., captured from a wrist-mounted image sensor) may include dolphin D 508 (corresponding to times/frames when the wrist-mounted image sensor captured the dolphin), and/or other highlight moments.

Highlight moments within video E 335 (e.g., captured from a surfboard-mounted image sensor) may include standing E 509 (corresponding to times/frames when surfer 300 stood up on the surfboard), within wave tunnel E 510 (corresponding to times/frames when surfer 300 was within the wave tunnel), wipeout E 511 (corresponding to a time/frame when surfer 300 lost his balance and wiped out), and/or other highlight moments. Other highlight moments are contemplated.

Storage component 108 may be configured to store the identification of one or more sets of highlight moments. Storage component 108 may store the identification of one or more sets of highlight moments in video information for the video content and/or in other locations. For example, for videos 331, 332, 333, 334, 335, storage component 108 may store the identification of highlight moments/sets of highlight moments within the video information for videos 331, 332, 333, 334, 335, the metadata associated with videos 331, 332, 333, 334, 335, and/or other locations. The identification of highlight moments stored may include information relating to the time(s)/frame(s) corresponding to the highlight moments, the identity/conveyance position/type of image sensor that captured the highlight moment, the highlight criteria that was used/met to identify the highlight moments, video segment(s) including the highlight moments, and/or other information about the highlight moments.

Video summary component 110 may be configured to generate one or more video summaries based on one or more sets of highlight moments within one or more video content. For example, video summary component 110 may generate one or more video summaries based on one or more sets of highlight moments within videos 331, 332, 33, 334, 335, and/or other information.

In some implementations, generating a video summary based on one or more sets of highlight moments may include identifying one or more sets of video segments from the video content. For example, generating a video summary based on one or more sets of highlight moments identified within videos 331, 332, 33, 334, 335 may include identifying one or more sets of video segments from video A 331, one or more sets of video segments from video B 332, one or more sets of video segments from video C 333, one or more sets of video segments from video D 334, and/or one or more sets of video segments from video E 335.

A set of video segments may include one or more video segments. A video segment may include one or more highlight moments. For example, a set of video segments from video A 331 may include one or more video segments including highlight moments: enter wave tunnel A 501, within wave tunnel A 502, turn head A 503, and/or other highlight moments. A set of video segments from video B 332 may include one or more video segments including highlight moments: yelling B 504, facial emotion B 505, and/or other highlight moments. A set of video segments from video C 333 may include one or more video segments including highlight moments: within wave tunnel C 506, wipeout C 507, and/or other highlight moments. A set of video segments from video D 334 may include one or more video segments including highlight moments: dolphin D 508 and/or other highlight moments. A set of video segments from video E 335 may include one or more video segments including highlight moments: standing E 509, within wave tunnel E 510, wipeout E 511, and/or other highlight moments.

A video segment may include times/frames of video content corresponding to one or more highlight moments. For example, a video segment including the highlight moment within wave tunnel A 502 may include times/frames of video A 311 corresponding to within wave tunnel A 502.

A video segment may include times/frames of video content preceding and/or following one or more highlight moments. For example, a video segment including the highlight moment enter wave tunnel A 501 may include a portion of video A 331 that precedes the time/frame corresponding to enter wave tunnel A 501 and/or a portion of video A 331 that follows the time/frame corresponding to enter wave tunnel A 501. Including times/frames of video content preceding and/or following highlight moments in a video segment may provide content for the highlight moments. In some implementations, the amounts of preceding and/or following times/frames included in a video segment may be determined based on the particular highlight moment, the identity/conveyance position/type of image sensor that captured the highlight moment, the highlight criteria that was used/met to identify the highlight moments, and/or other information about the highlight moments.

A video segment may include times/frames of video content corresponding to a portion of one or more highlight moments. For example, the highlight moment within wave tunnel A 502 may be split up among two or more video segments. The video segments including portions of within wave tunnel A 502 may of equal or different lengths.

Figure 6:
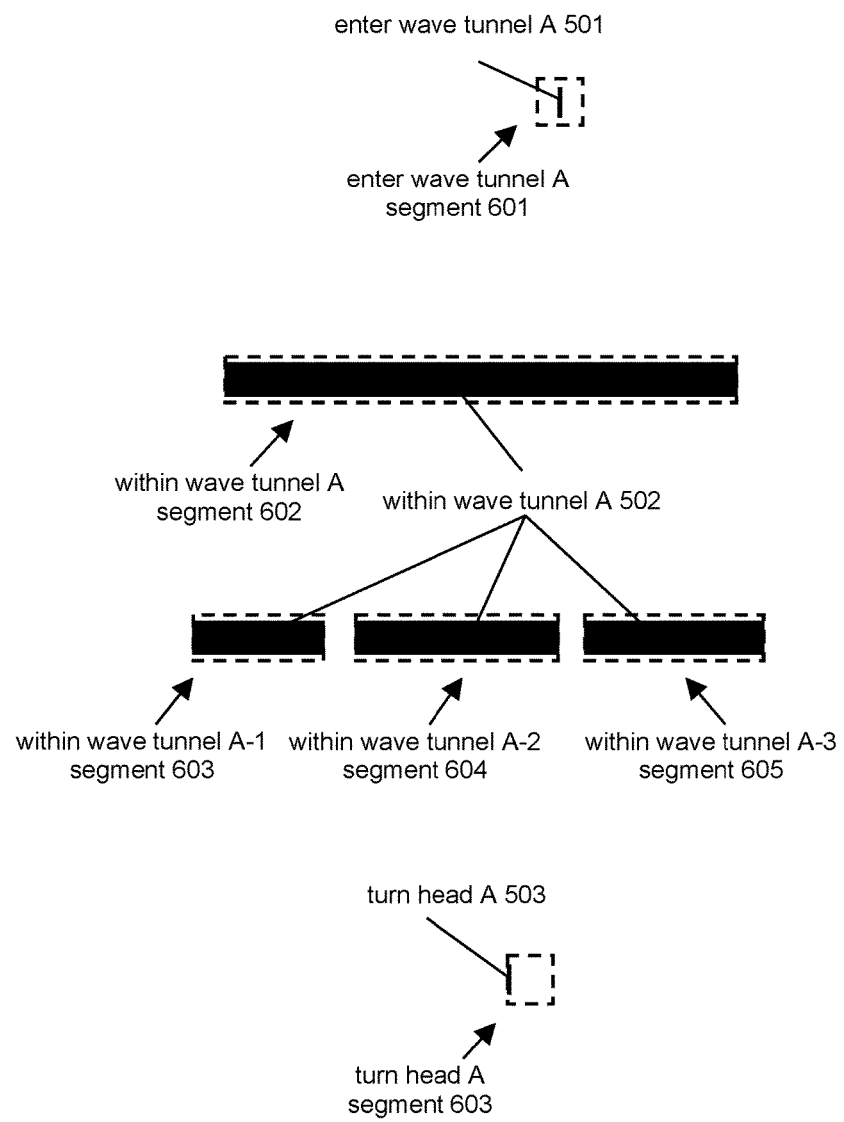
FIG. 6 illustrates exemplary video segments including highlight moments.

For example, FIG. 6 illustrates an exemplary set of video segments identified from video A 311. Video segments identified from video A 311 may include enter wave tunnel A segment 601, within wave tunnel A segment 602, turn head A segment 603, and/or other video segments.

Enter wave tunnel A segment 601 may include times/frames of video content A 331 corresponding to enter wave tunnel A 501, times/frames of video content A 331 that precedes and follows the time/frame corresponding to enter wave tunnel A 501, and/or other times/frames. In enter wave tunnel A segment 601, the amount of times/frames preceding enter wave tunnel A 501 may be the same or different from the amount of times/frames following enter wave tunnel A 501. Turn head A segment 603 may include times/frames of video content A 331 corresponding to turn head A 503, times/frames of video content A 331 that follows the time/frame corresponding to turn head A 503, and/or other times/frames.

Within wave tunnel A segment 602 may include times/frames of video content A 331 corresponding to within wave tunnel A 502, and/or other times/frames. In some implementations, within wave tunnel A segment 602 may be divided into smaller video segments of equal or different lengths. For example, within wave tunnel A segment 602 may be divided into within wave tunnel A-1 segment 603, within wave tunnel A-2 segment 604, within wave tunnel A-3 segment 605, and/or other video segments.

In some implementations, one or more video segments from a set of video segments and one or more video segments from another set of video segments may be arranged in a video summary based on times of capture of the one or more video segments. For example, one or more video segments from different sets of video segments from videos 331, 332, 333, 334, 335 may be arranged in a video summary based on times of capture of the video segments.

Figure 7A:
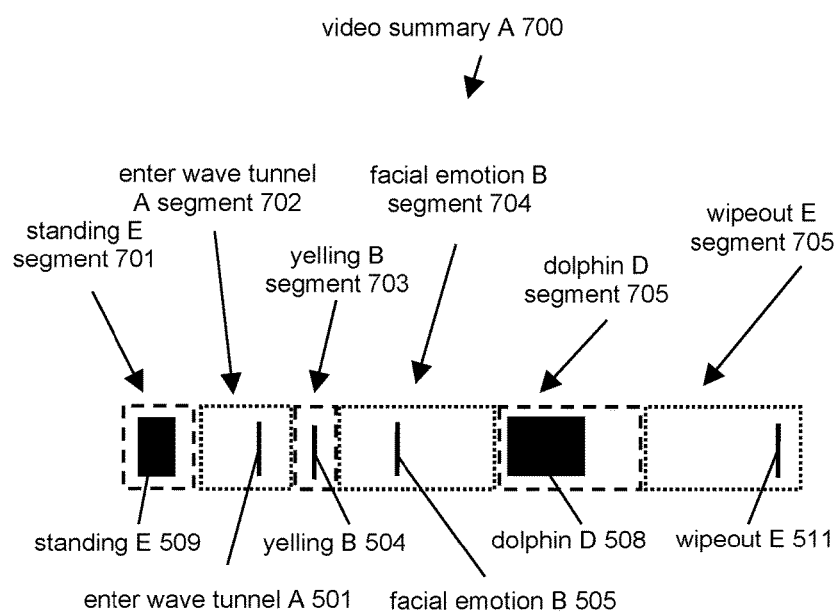
FIGS. 7A-7B illustrate exemplary video summaries.

Referring to FIG. 7A, an exemplary video summary A 700 may include standing E segment 701, enter wave tunnel A segment 702, yelling B segment 703, facial emotion B segment 704, dolphin D segment 705, wipeout E segment 706, and/or other video segments. Standing E segment 701, enter wave tunnel A segment 702, yelling B segment 703, facial emotion B segment 704, dolphin D segment 705, and wipeout E segment 706 may be arranged in chronological order so that the highlight moments are presented in the order they occurred. Other arrangements of video segments based on times of capture of the video segments are contemplated.

Standing E segment 701 may include a video segment from video E 335 that includes the times/frames of video E 335 corresponding to highlight moment standing E 509. Enter wave tunnel A segment 702 may include a video segment from video A 331 that includes the times/frames of video A 331 corresponding to highlight moment enter wave tunnel A 501. Yelling B segment 703 may include a video segment from video B 332 that includes the times/frames of video B 332 corresponding to highlight moment yelling B 504. Facial emotion B segment 704 may include a video segment from video B that includes the times/frames of video B 332 corresponding to highlight moment facial emotion B 505. Dolphin D segment 705 may include a video segment from video D 334 that includes the times/frames of video D 334 corresponding to highlight moment dolphin D 508. Wipeout E segment 706 may include a video segment from video E 335 that includes the times/frames of video E 335 corresponding to highlight moment wipeout E 511.

In some implementations, one or more video segments from a set of video segments and one or more video segments from another set of video segments included in the video summary may include views of one or more same scenes. For example, one or more video segments from different sets of video segments from videos 331, 332, 333, 334, 335 may be arranged in a video summary and may include views of one or more same scenes.

Figure 7B:
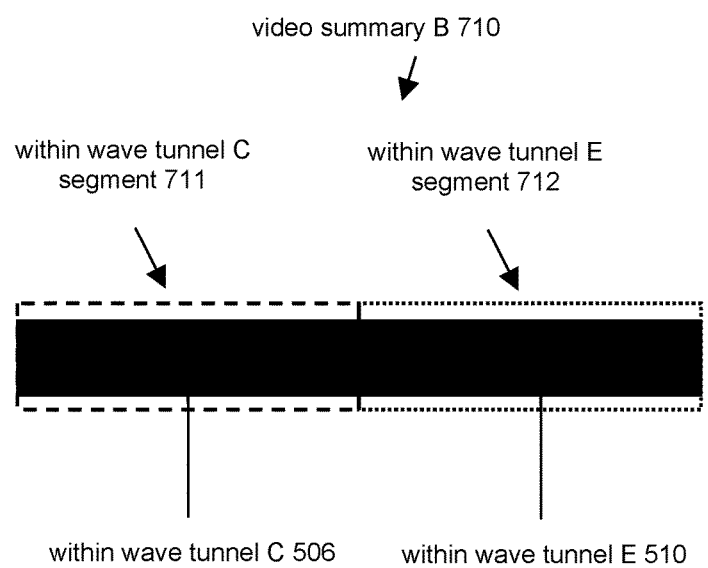

Referring to FIG. 7B, an exemplary video summary B 710 may include within wave tunnel C segment 711, within wave tunnel E segment 712, and/or other video segments. Within wave tunnel C segment 711 and within wave tunnel E segment 712 may include view of one or more same scenes (e.g., wave tunnel). Within wave tunnel C segment 711 may include a video segment from video C 333 that includes the times/frames of video C 333 corresponding to highlight moment within wave tunnel C 506. Within wave tunnel E segment 712 may include a video segment from video E 335 that includes the times/frames of video E 335 corresponding to highlight moment within wave tunnel E 510. Such an arrangement of video segments may provide a video summary that provides multiple views of the same scene(s) (e.g., wave tunnel). Other inclusion of video segments including views of one or more same scenes are contemplated.

In some implementations, one or more video segments from a set of video segments and one or more video segments from another set of video segments may be arranged in a video summary based on times of capture of the one or more video segments and may include views of one or more same scenes. For example, a video summary may include multiple views of the wave tunnel as captured by video A 331, video C 333, and/or video E 335 with the views switching back and forth between videos 331, 333, 335. For example, the first two seconds of the video summary may include a video segment from video A 331, the next two seconds of the video summary may include a video segment from video C 333, the next two seconds of the video summary may include a video segment from video E 335, and so forth. The switching back and forth of views of the wave tunnel between videos 331, 333, 335 may be cyclical or random. Such an arrangement of video segments may provide a video summary that provides multiple views of the same scene(s) (e.g., wave tunnel) in chronological order.

In some implementations, the speed of one or more video segments/highlight moments within a video summary may be changed. For example, one or more video segments/highlight moments may be slowed and/or sped up. In some implementations, one or more video segments/highlight moments within a video summary may be aligned with one or more music and/or audio effects.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor 11 and electronic storage 12 are shown to be connected to interface 13 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination. Processor 11 may be configured to execute one or more components by software; hardware; firmware; some combination of software, hardware, and/or firmware; and/or other mechanisms for configuring processing capabilities on processor 11.

It should be appreciated that although computer components are illustrated in FIG. 1 as being co-located within a single processing unit, in implementations in which processor 11 comprises multiple processing units, one or more of computer program components may be located remotely from the other computer program components.

The description of the functionality provided by the different computer program components described herein is for illustrative purposes, and is not intended to be limiting, as any of computer program components may provide more or less functionality than is described. For example, one or more of computer program components 102, 104, 106, 108, and/or 110 may be eliminated, and some or all of its functionality may be provided by other computer program components. As another example, processor 11 may be configured to execute one or more additional computer program components that may perform some or all of the functionality attributed to one or more of computer program components 102, 104, 106, 108, and/or 110 described herein.

The electronic storage media of electronic storage 12 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 12 may be a separate component within system 10, or electronic storage 12 may be provided integrally with one or more other components of system 10 (e.g., processor 11). Although electronic storage 12 is shown in FIG. 1 as a single entity, this is for illustrative purposes only. In some implementations, electronic storage 12 may comprise a plurality of storage units. These storage units may be physically located within the same device, or electronic storage 12 may represent storage functionality of a plurality of devices operating in coordination.

Figure 2:
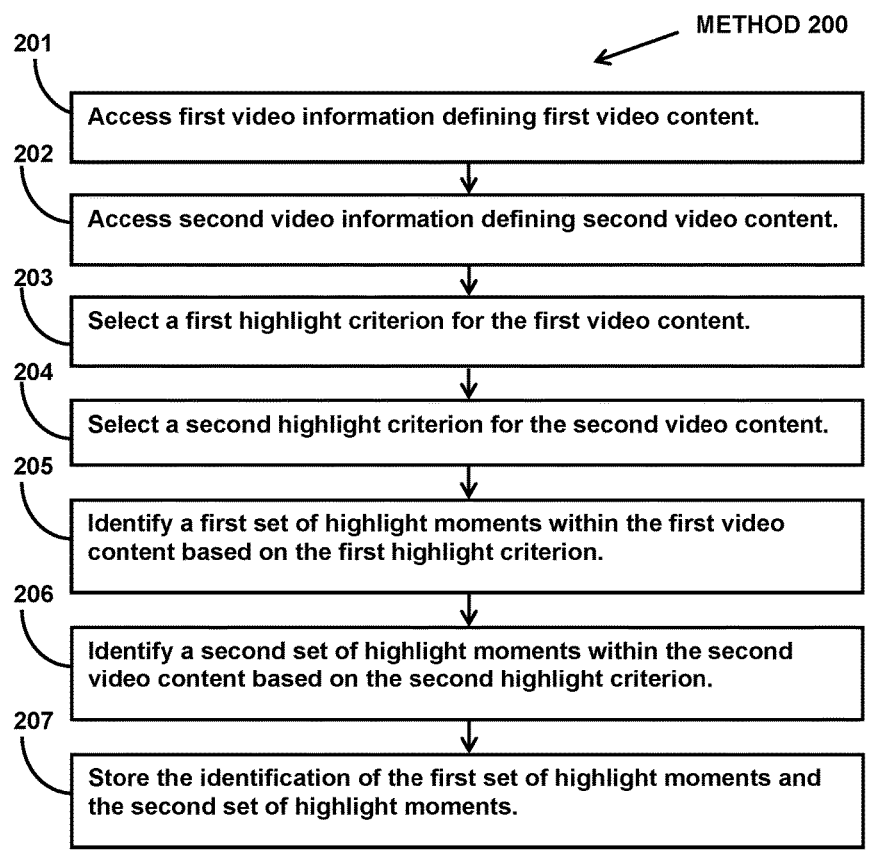
FIG. 2 illustrates a method for determining video highlights based on conveyance positions of video content capture.

FIG. 2 illustrates method 200 for determining video highlights based on conveyance positions of video content capture. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, first video information defining first video content may be accessed. The first video content may have been captured by a first image sensor from a first conveyance position. In some implementation, operation 201 may be performed by a processor component the same as or similar to video information component 102 (Shown in FIG. 1 and described herein).

At operation 202, second video information defining second video content may be accessed. The second video content may have been captured by a second image sensor from a second conveyance position. In some implementations, operation 202 may be performed by a processor component the same as or similar to video information component 102 (Shown in FIG. 1 and described herein).

At operation 203, a first highlight criterion for the first video content may be selected. The first highlight criterion may be selected based on the first conveyance position. In some implementations, operation 203 may be performed by a processor component the same as or similar to user highlight criterion component 104 (Shown in FIG. 1 and described herein).

At operation 204, a second highlight criterion for the second video content may be selected. The second highlight criterion may be selected based on the second conveyance position. In some implementations, operation 204 may be performed by a processor component the same as or similar to highlight criterion component 104 (Shown in FIG. 1 and described herein).

At operation 205, a first set of highlight moments within the first video content may be identified. The first set of highlight moments may be identified based on the first criterion. In some implementations, operation 205 may be performed by a processor component the same as or similar to highlight identification component 106 (Shown in FIG. 1 and described herein).

At operation 206, a second set of highlight moments within the second video content may be identified. The second set of highlight moments may be identified based on the second criterion. In some implementations, operation 206 may be performed by a processor component the same as or similar to highlight identification component 106 (Shown in FIG. 1 and described herein).

At operation 207, the identification of the first set of highlight moments and the second set of highlight moments may be stored. In some implementations, operation 207 may be performed by a processor component the same as or similar to storage component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for determining video highlights based on conveyance positions of video content capture, the system comprising:
one or more physical processors configured by machine-readable instructions to:
access first video information defining first video content, the first video content captured by a first image sensor from a first conveyance position;
access second video information defining second video content, the second video content captured by a second image sensor from a second conveyance position different from the first conveyance position;
select different highlight criterion for different video content based on different conveyance positions of image sensors that captured the different video content such that a first highlight criterion is selected for the first video content based on the first conveyance position of the first image sensor and a second highlight criterion is selected for the second video content based on the second conveyance position of the second image sensor, the second highlight criterion being different from the first highlight criterion;
identify a first set of highlight moments within the first video content based on the first criterion;
identify a second set of highlight moments within the second video content based on the second criterion; and
store the identification of the first set of highlight moments and the second set of highlight moments.

2. The system of claim 1, wherein the one or more physical processors are further configured to generate a video summary based on the first set of highlight moments and the second set of highlight moments.

3. The system of claim 2, wherein generating the video summary based on the first set of highlight moments and the second set of highlight moments includes:
identifying a first set of video segments from the first video content and a second set of video segments from the second video content, the first set of video segments including one or more of the first set of highlight moments and the second set of video segments including one or more of the second set of highlight moments; and
arranging one or more video segments from the first set of video segments and one or more video segments from the second set of video segments in the video summary based on times of capture of the one or more video segments from the first set of video segments and the one or more video segments from the second set of video segments.

4. The system of claim 2, wherein generating the video summary based on the first set of highlight moments and the second set of highlight moments includes:
identifying a first set of video segments from the first video content and a second set of video segments from the second video content, the first set of video segments including one or more of the first set of highlight moments and the second set of video segments including one or more of the second set of highlight moments; and
including one or more video segments from the first set of video segments and one or more video segments from the second set of video segments in the video summary, the one or more video segments from the first set of video segments and the one or more video segments from the second set of video segments including views of a same scene.

5. The system of claim 1, wherein the first video content and the second video content are time synced.

6. The system of claim 1, wherein the first conveyance position of the first image sensor indicates a type of the first image sensor.

7. The system of claim 6, wherein the type of first image sensor includes a handheld image sensor, a body-mounted image sensor, a head-mounted image sensor, or an object-mounted image sensor.

8. The system of claim 1, wherein the first conveyance position of the first image sensor is determined based on metadata associated with the first video content, visual analysis of the first video content, manual identification of the first conveyance position, or an image sensor mount for the first image sensor.

9. The system of claim 1, wherein the first highlight criterion includes a visual criterion, an audio criterion, and/or a metadata criterion.

10. A method for determining video highlights based on conveyance positions of video content capture, the method comprising:
accessing first video information defining first video content, the first video content captured by a first image sensor from a first conveyance position;
accessing second video information defining second video content, the second video content captured by a second image sensor from a second conveyance position different from the first conveyance position;
selecting different highlight criterion for different video content based on different conveyance positions of image sensors that captured the different video content such that a first highlight criterion is selected for the first video content based on the first conveyance position of the first image sensor and a second highlight criterion is selected for the second video content based on the second conveyance position of the second image sensor, the second highlight criterion being different from the first highlight criterion;
identifying a first set of highlight moments within the first video content based on the first criterion;
identifying a second set of highlight moments within the second video content based on the second criterion; and
storing the identification of the first set of highlight moments and the second set of highlight moments.

11. The method of claim 10, further comprising generating a video summary based on the first set of highlight moments and the second set of highlight moments.

12. The method of claim 11, wherein generating the video summary based on the first set of highlight moments and the second set of highlight moments includes:
identifying a first set of video segments from the first video content and a second set of video segments from the second video content, the first set of video segments including one or more of the first set of highlight moments and the second set of video segments including one or more of the second set of highlight moments; and
arranging one or more video segments from the first set of video segments and one or more video segments from the second set of video segments in the video summary based on times of capture of the one or more video segments from the first set of video segments and the one or more video segments from the second set of video segments.

13. The method of claim 11, wherein generating the video summary based on the first set of highlight moments and the second set of highlight moments includes:
identifying a first set of video segments from the first video content and a second set of video segments from the second video content, the first set of video segments including one or more of the first set of highlight moments and the second set of video segments including one or more of the second set of highlight moments; and
including one or more video segments from the first set of video segments and one or more video segments from the second set of video segments in the video summary, the one or more video segments from the first set of video segments and the one or more video segments from the second set of video segments including views of a same scene.

14. The method of claim 10, wherein the first video content and the second video content are time synced.

15. The method of claim 10, wherein the first conveyance position of the first image sensor indicates a type of the first image sensor.

16. The method of claim 15, wherein the type of first image sensor includes a handheld image sensor, a body-mounted image sensor, a head-mounted image sensor, or an object-mounted image sensor.

17. The method of claim 10, wherein the first conveyance position of the first image sensor is determined based on metadata associated with the first video content, visual analysis of the first video content, manual identification of the first conveyance position, or an image sensor mount for the first image sensor.

18. The method of claim 10, wherein the first highlight criterion includes a visual criterion, an audio criterion, and/or a metadata criterion.

19. A system for determining video highlights based on conveyance positions of video content capture, the system comprising:

one or more physical processors configured by machine-readable instructions to:

access first video information defining first video content, the first video content captured by a first image sensor from a first conveyance position, the first conveyance position indicating a type of the first image sensor;

access second video information defining second video content, the second video content captured by a second image sensor from a second conveyance position different from the first conveyance position, the second conveyance position indicating a type of the second image sensor, wherein the first video content and the second video content are time synced;

select different highlight criterion for different video content based on different conveyance positions of image sensors that captured the different video content such that a first highlight criterion is selected for the first video content based on the first conveyance position of the first image sensor and a second highlight criterion is selected for the second video content based on the second conveyance position of the second image sensor, the second highlight criterion being different from the first highlight criterion;

identify a first set of highlight moments within the first video content based on the first criterion;

identify a second set of highlight moments within the second video content based on the second criterion;

store the identification of the first set of highlight moments and the second set of highlight moments; and generate a video summary based on the first set of highlight moments and the second set of highlight moments.

20. The system of claim 19, wherein the type of first image sensor includes a handheld image sensor, a body-mounted image sensor, a head-mounted image sensor, or an object-mounted image sensor.

* * * * *